US012091904B2

(12) United States Patent
Benedetti et al.

(10) Patent No.: US 12,091,904 B2
(45) Date of Patent: Sep. 17, 2024

(54) HINGE DEVICE FOR THE ROTATABLE MOVEMENT OF A CLOSING ELEMENT

(71) Applicant: Colcom Group S.p.A., Nave (IT)

(72) Inventors: Luca Benedetti, Nave (IT); Mihai Mesaros, Nave (IT)

( * ) Notice: Subject to any disclaimer, the term of this patent is extended or adjusted under 35 U.S.C. 154(b) by 278 days.

(21) Appl. No.: 17/641,433

(22) PCT Filed: Jul. 29, 2020

(86) PCT No.: PCT/IB2020/057130
§ 371 (c)(1),
(2) Date: Mar. 9, 2022

(87) PCT Pub. No.: WO2021/048651
PCT Pub. Date: Mar. 18, 2021

(65) Prior Publication Data

US 2022/0298840 A1 Sep. 22, 2022

(30) Foreign Application Priority Data

Sep. 13, 2019 (IT) ........................ 102019000016223

(51) Int. Cl.

| | |
|---|---|
| ***E05F 3/20*** | (2006.01) |
| ***E05F 3/10*** | (2006.01) |
| ***E05F 3/12*** | (2006.01) |

(52) U.S. Cl.
CPC ................ *E05F 3/20* (2013.01); *E05F 3/108* (2013.01); *E05F 3/12* (2013.01);
(Continued)

(58) Field of Classification Search
CPC .... E05F 3/20; E05F 3/108; E05F 3/12; E05Y 2201/412; E05Y 2800/296; E05Y 2900/132; E05Y 2600/41; E05Y 2201/21
See application file for complete search history.

(56) References Cited

U.S. PATENT DOCUMENTS 7,712,186 B2 * 5/2010 Kang ........................ E05F 5/00 16/330
8,627,547 B2 * 1/2014 Soh ........................ E05F 1/1253 439/31

(Continued)

FOREIGN PATENT DOCUMENTS

| | | |
|---|---|---|
| WO | 20160151541 | 9/2016 |
| WO | 2018000029 | 1/2018 |
| WO | 2018116275 | 6/2018 |

*Primary Examiner* — Christine M Mills
*Assistant Examiner* — Matthew J Sullivan
(74) *Attorney, Agent, or Firm* — Themis Law

(57) ABSTRACT

A hinge device for the rotatable movement of a closing element, such as a door, a window, a shutter or the like, between a closing position and an opening position, includes a fixed element anchorable to a stationary support structure; a movable element anchorable to the closing element so that the movable element rotates around a first longitudinal axis between a first opening position and a second closing position; a plunger that is operatively coupled to the movable element by a coupling system configured so that along a first section of the sliding of a connecting shaft, the plunger does not slide, thereby allowing a free rotation of the movable element, and along a second section of the sliding of the connecting shaft, the plunger slides integrally joined with the connecting shaft, thereby controlling the rotation of the movable element.

9 Claims, 9 Drawing Sheets

(52) U.S. Cl.
CPC ... *E05Y 2201/412* (2013.01); *E05Y 2800/296* (2013.01); *E05Y 2900/132* (2013.01)

(56) References Cited

U.S. PATENT DOCUMENTS

| | | | | |
|---|---|---|---|---|
| 9,487,988 | B2 * | 11/2016 | Bacchetti | E05F 3/18 |
| 9,605,462 | B2 * | 3/2017 | Bacchetti | E05F 3/20 |
| 9,803,410 | B2 * | 10/2017 | Miglioranzo | E05F 3/20 |
| 10,301,859 | B2 * | 5/2019 | Miglioranzo | E05F 3/108 |
| 10,472,870 | B2 * | 11/2019 | Tassi | E05F 3/10 |
| 10,563,439 | B2 * | 2/2020 | Miglioranzo | E05D 7/04 |
| 11,274,483 | B2 * | 3/2022 | Benedetti | E05F 3/12 |
| 11,905,749 | B2 * | 2/2024 | Benedetti | E05F 3/10 |
| 2016/0215549 | A1 | 7/2016 | Bacchetti | |
| 2018/0238092 | A1 * | 8/2018 | Feng | E05F 3/14 |
| 2024/0182015 | A1 * | 6/2024 | Crews | F03H 99/00 |

* cited by examiner

HINGE DEVICE FOR THE ROTATABLE MOVEMENT OF A CLOSING ELEMENT

FIELD OF THE INVENTION

The present invention generally relates to the technical field of hinges, and in particular it relates to a hinge with small overall dimensions for the rotatable movement of a shutter or the like with respect to a support structure.

State of the Art

Hinges for the rotatable movement of a door or shutter with respect to a support structure comprising an element anchored to the support structure and an element anchored to the shutter rotatably movable with respect to each other to allow the opening/closing of the door are known.

It is also known that it is necessary to control this rotary movement, for example to damp the opening and/or closing or to promote one of the latter. In particular, known is the need to control/damp the movement of the door or to promote the rotation of the latter only for a section of the movement of the door.

In this sense, known are mechanical hinges which are capable of controlling the movement.

Such hinges can be improved, particularly as regards their overall dimensions.

SUMMARY OF THE INVENTION

An object of the present invention is to at least partly overcome the drawbacks outlined above, by providing a hinge for the rotary movement of a closing element that is highly functional and cost-effective.

Another object of the invention is to provide a hinge with small overall dimensions.

Another object of the invention is to provide a hinge that allows damping during the opening and/or the closing of the closing element.

Another object of the invention is to provide a hinge which promotes the opening and/or the closing of the closing element.

Another object of the invention is to provide a hinge which allows to control the movement of the door during an angular section of the rotation thereof.

These and other objects that will be more apparent hereinafter are achieved by a hinge device according to what is described and/or claimed and/or illustrated herein.

Advantageous embodiments of the invention are defined according to the dependent claims.

BRIEF DESCRIPTION OF THE DRAWINGS

Further characteristics and advantages of the invention will be more apparent in light of the detailed description some preferred but non-exclusive embodiments of the invention, illustrated by way of non-limiting example with reference to the attached drawings, wherein.

DETAILED DESCRIPTION OF SOME PREFERRED EMBODIMENTS

Figure 1A:
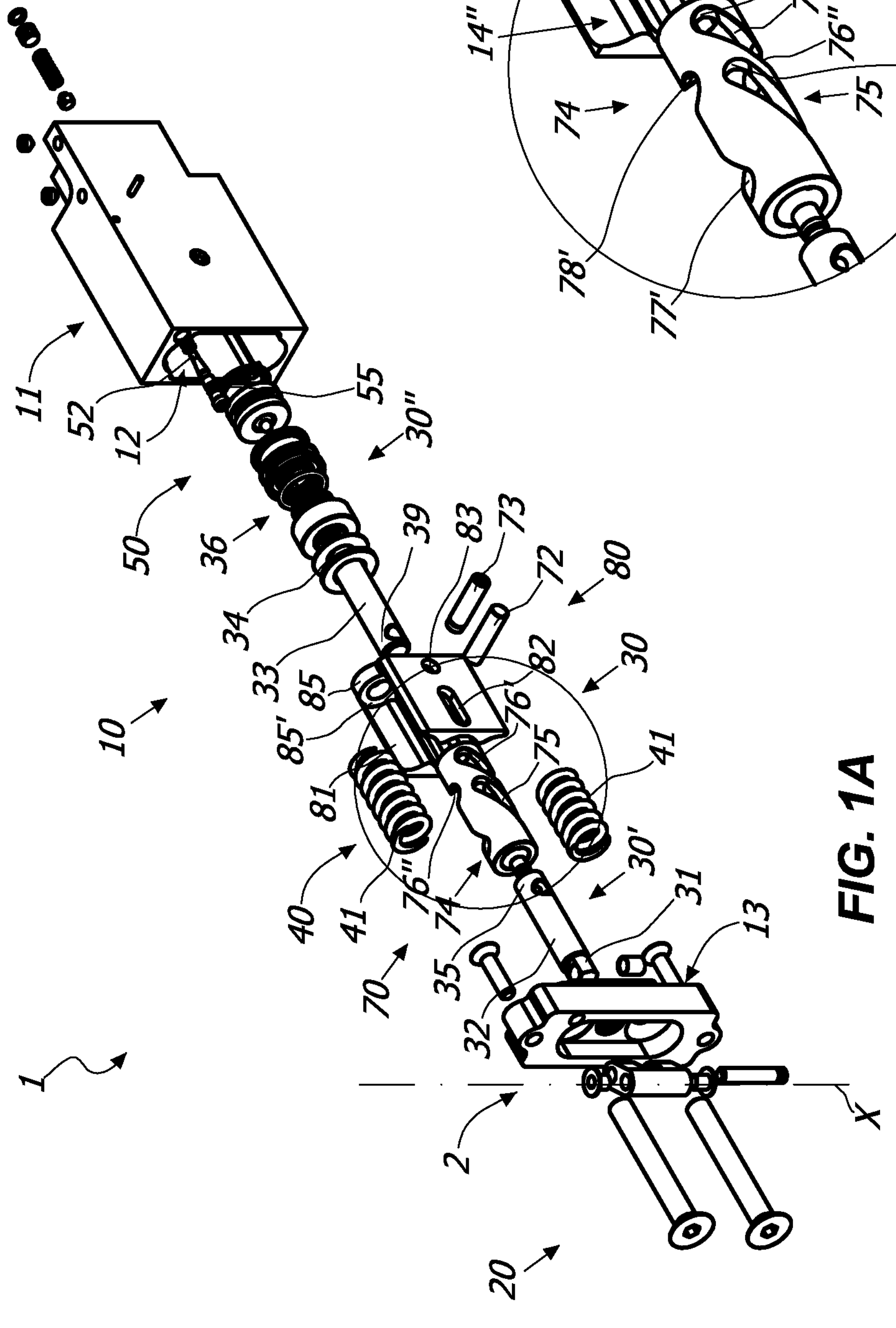
FIG. 1A is an exploded view of a hinge device 1, with FIG. 1B showing some enlarged details of FIG. 1A.
Figure 1B:
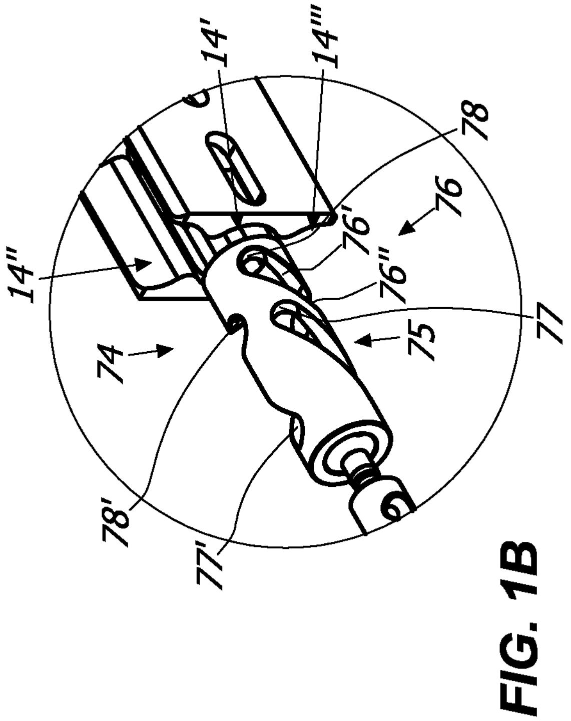
Figure 2:
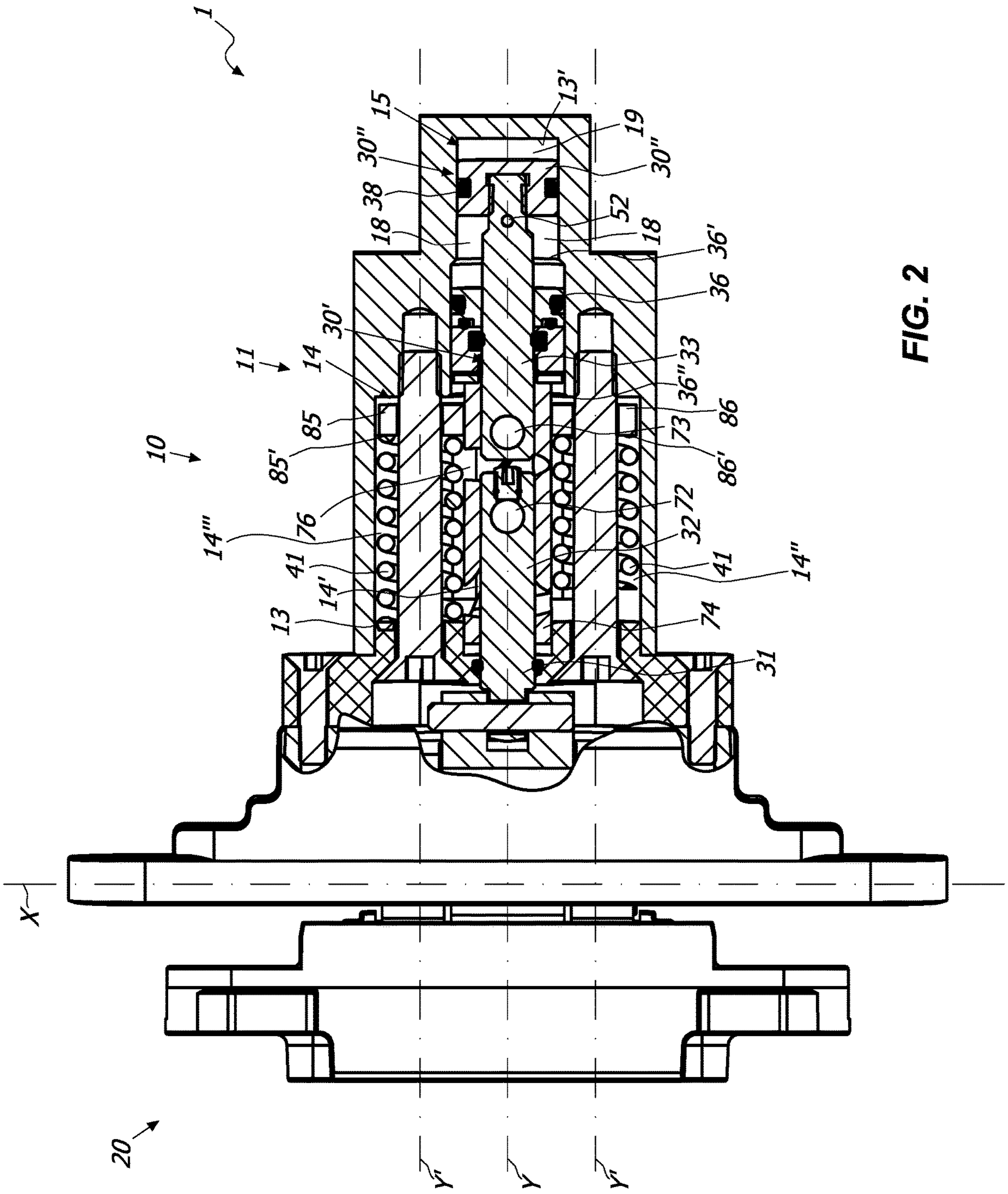
FIG. 2 is a cross-sectional view of the hinge device 1 of FIG. 1A.
Figure 3:
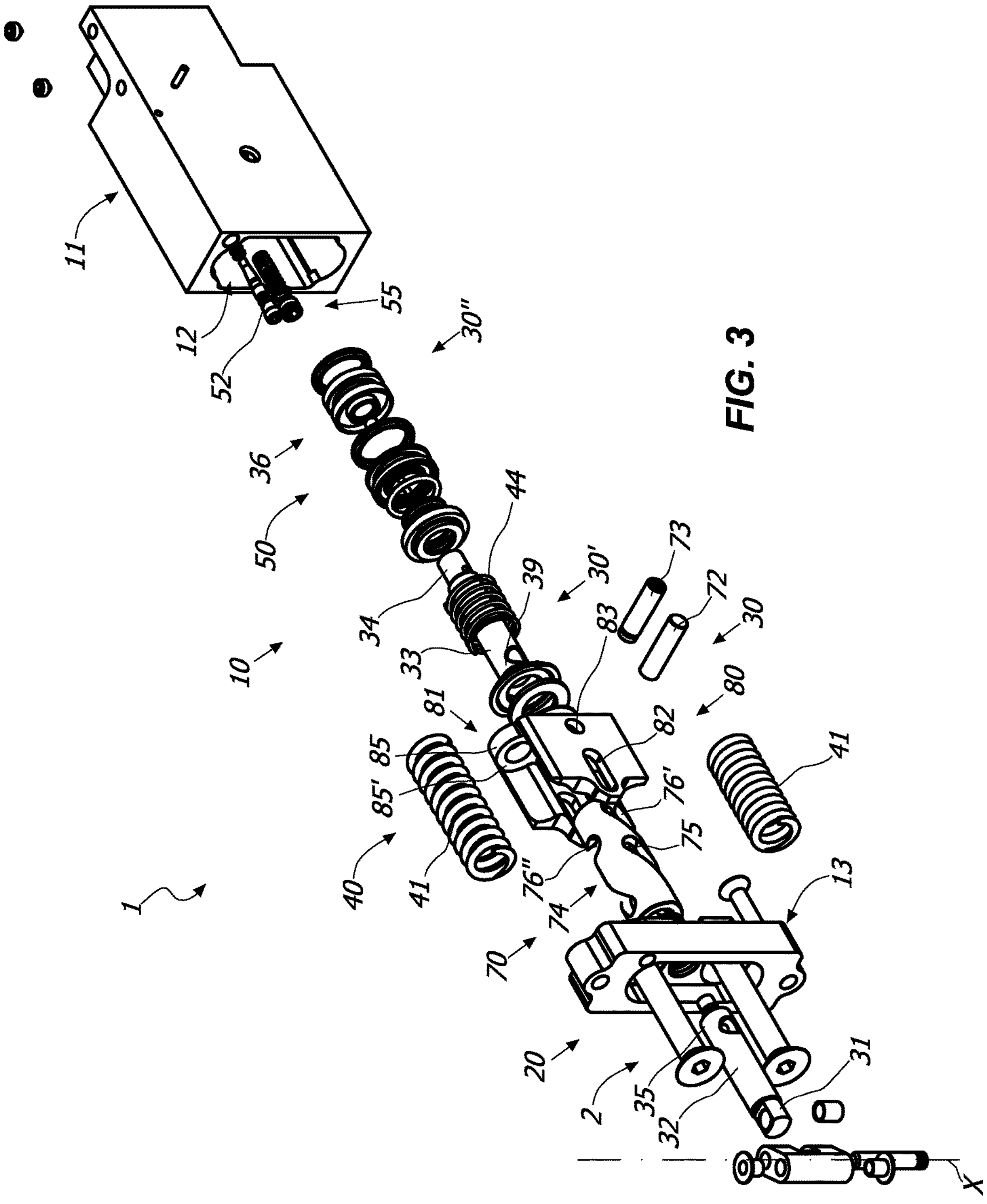
FIG. 3 is an exploded view of a different embodiment of the hinge device 1.
Figure 4B:
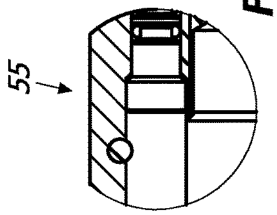
FIG. 4A is a cross-sectional view of the hinge device 1 of FIG. 3, with FIG. 4B showing some enlarged details of FIG. 4A.
Figure 4A:
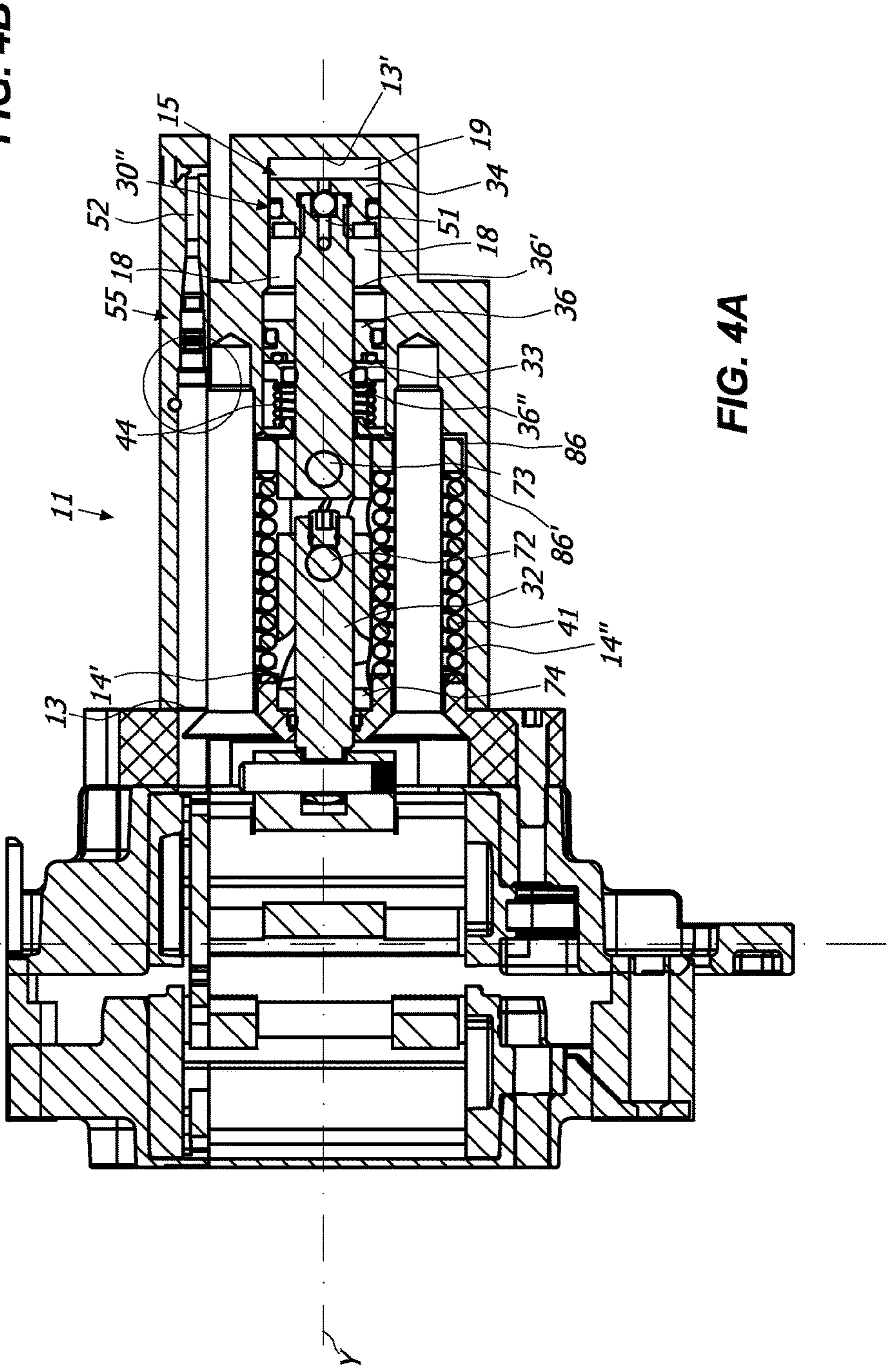
Figure 5:
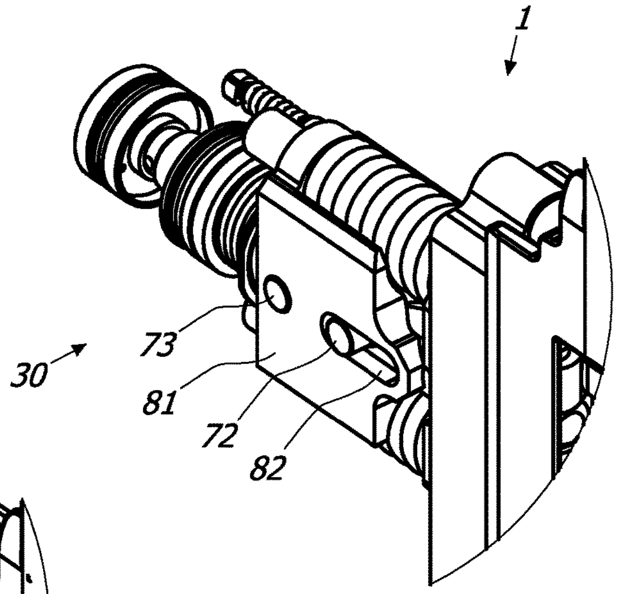
FIGS. 5, 6, 7, FIGS. 8, 9, 10 and FIGS. 11, 12, 13 are views of some details of the hinge device 1 of FIG. 3 in different operating steps, respectively in an axonometric view, in a partially cross-sectional and sectional view.
Figure 6:
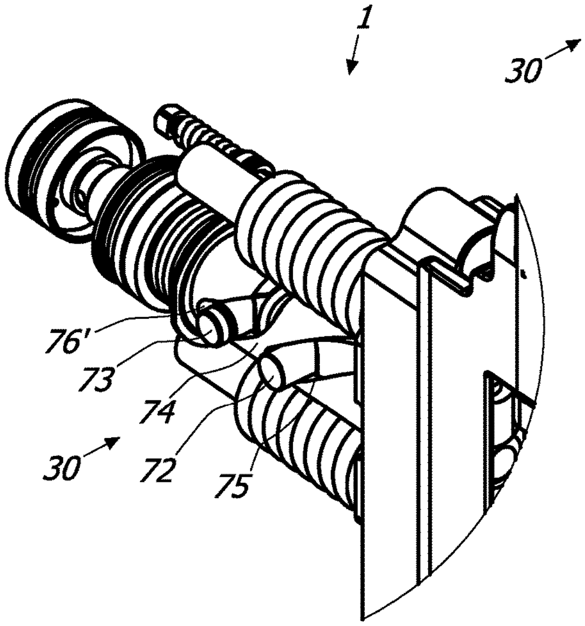

With reference to the aforementioned figures, herein described is a hinge device 1, hereinafter simply a hinge, for the rotatable movement of a closing element D, such as a door, a window, a shutter or the like with respect to a stationary support structure S, such as a wall, a floor, a frame or the like.

In particular, the closing element D may rotate between at least one closing position and at least one opening position.

Preferably, but not exclusively, the closing element D may be a door while the supporting structure S may be a support frame thereof.

The hinge device 1 may be of the mechanical and hydraulic type, and it may preferably comprise mechanical elements 40 and hydraulic elements 50 for controlling the movement of the door D, as better explained hereinafter.

In other words, the hinge device 1 may be configured to control the movement during the opening and/or the closing of the shutter D and/or to promote/damp the opening and/or the closing thereof.

According to a particular aspect of the invention, the hinge device 1 may be configured to allow to control and/or damp and/or promote the movement of the door only for a section of the movement thereof.

Essentially, the hinge device 1, hereinafter simply hinge 1, may comprise a fixed element 10 anchorable to one of the frame S and the shutter D and a movable element 20 anchorable to the other between the frame S and the shutter D.

By way of non-limiting example, the movable element 20 may be coupled to the door D while the fixed element 10 may be coupled to the frame S. Furthermore, it is clear that the movable element 20 and the fixed element 10 may not necessarily be coupled directly with the door D and the frame S, since it is sufficient that there be an operative connection between them.

Even if hereinafter and in the figures, reference is made to such embodiment, it is clear that the movable element 20 may be anchored to the frame S and the fixed element 10 may be anchored to the shutter D without departing from the scope of protection of the present invention.

In any case, the movable element 20 and the fixed element 10 may be mutually coupled so as to mutually rotate around a longitudinal axis X between a first operative position corresponding to the position for opening or closing the door D and a second operative position corresponding to the position for closing or opening the door D.

The hinge 1 may further comprise a main body 11 which may be substantially parallelepiped-shaped and extending along an axis Y substantially perpendicular to the axis X.

Suitably, a plunger element 30 which may slide along the axis Y in response to the rotation of the movable element 20 between a stroke-start position and a stroke-end position may thus be provided for. In particular, the plunger element 30 may be operatively coupled to the fixed element 10 so that the rotation of the movable element 20 corresponds to the sliding of the plunger element 30 along the axis Y.

In other words, any actuation system 2 which is suitable to promote the sliding of the plunger 30 upon the rotation of the movable element 20 with respect to the fixed element 10 may be present.

For example, a lever system 2 may be provided for. In such case, the hinge 1 may be a lever hinge, or, even if not shown in the figures, cam and cam follower means of the per se known type may be provided for.

Advantageously, a connecting shaft 32 arranged along the same axis Y for the connection of the plunger element 30 with the actuation system 2 may be provided for. In particular, the connecting shaft 32 may thus have an end 31 coupled with the actuation system 2 so that the sliding of the shaft 32 along the axis Y corresponds to the rotation of the movable element 20.

Preferably, the actuator system 2 may be coupled with the operative end 31 so that the sliding of the shaft 32 between at least one proximal operative position and at least one distal operative position corresponding respectively to the door open and door closed position. In other words, the sliding of the shaft 32 may promote the rotation of the door D and the rotation of the door D may promote the sliding of the shaft 32. For example, they may be coupled by means of through holes and pins of per se known type.

Figure 13:
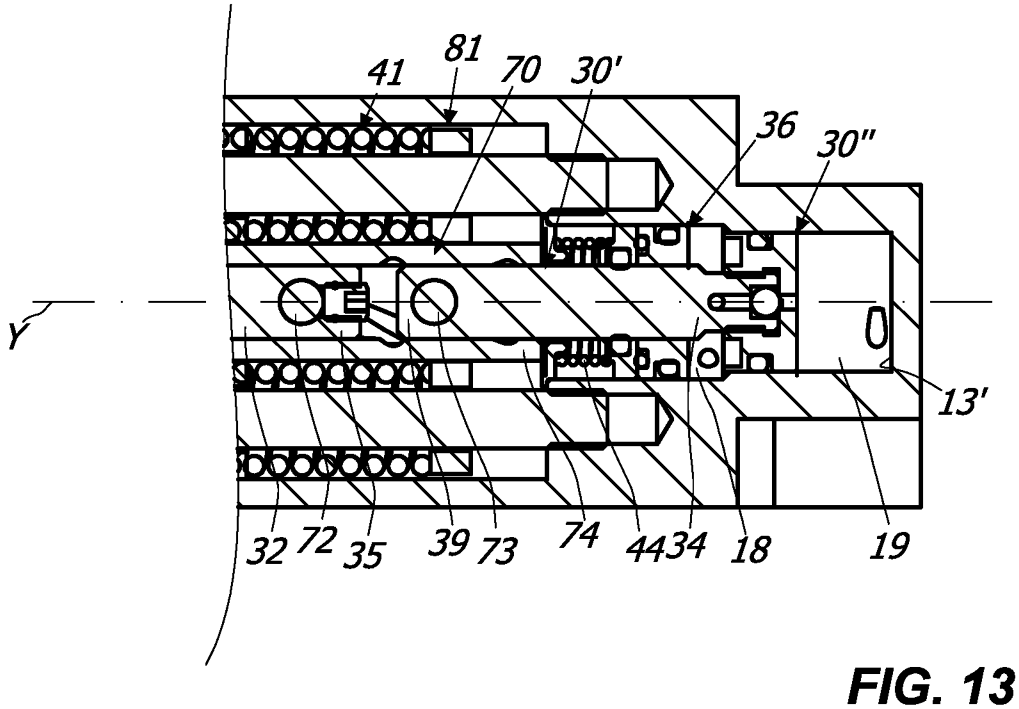
Figure 14:
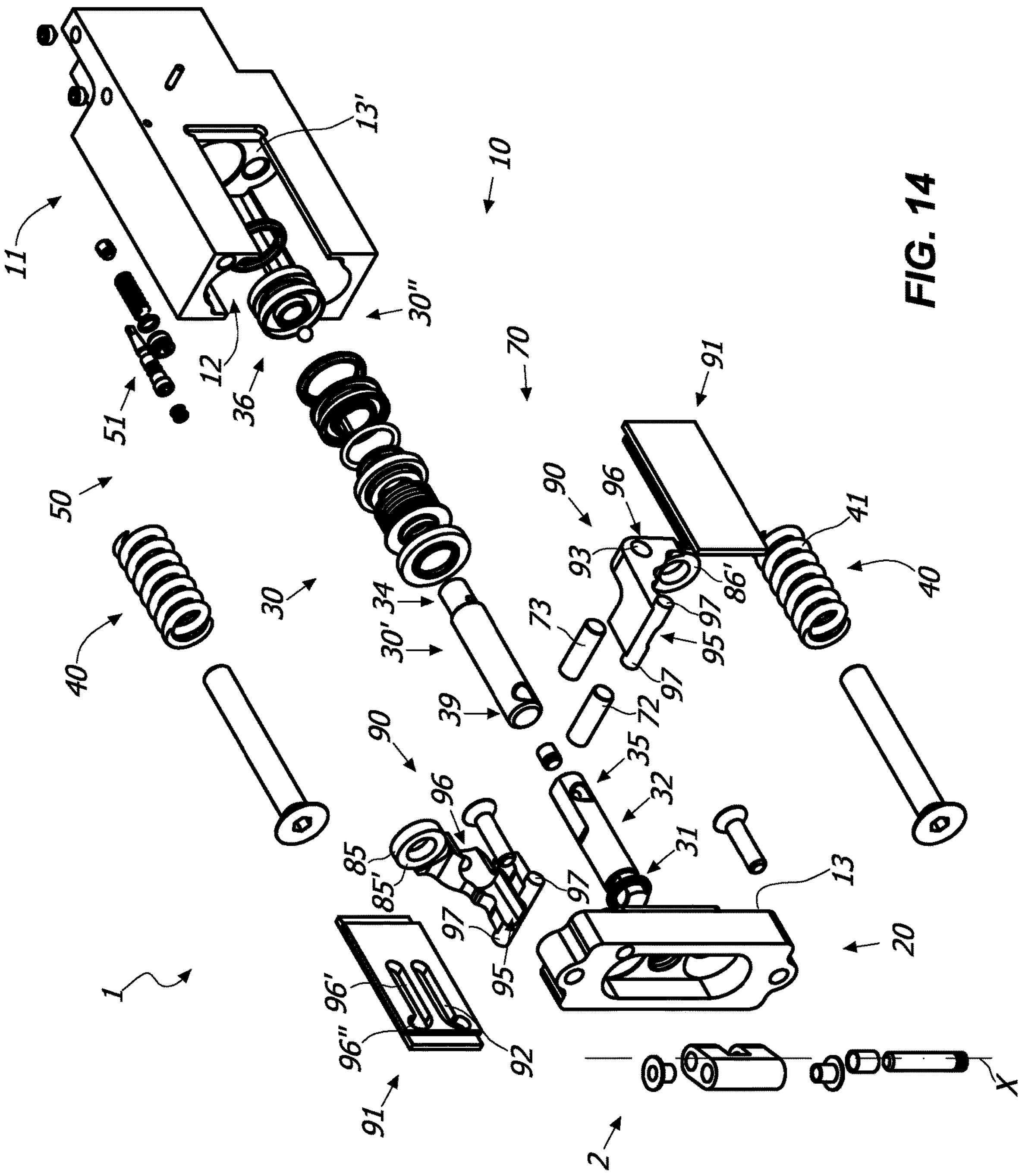
FIG. 14 is an exploded view of a different embodiment of the hinge device 1.

According to a particular aspect of the invention, the shaft 32 may slide along the axis Y between the first proximal operative position (FIG. 13) and an intermediate position (FIG. 10) between the proximal and distal positions to define a section T1 of the stroke thereof and between the intermediate position (FIG. 10) and the distal operative position (FIG. 7) to define a section T2 of the stroke thereof.

Suitably, as better explained hereinafter, at the section T1 of the stroke of the shaft 32, the door D may be free to rotate, while at the section T2 the door D may be rotatably controlled.

In particular, the plunger element 30 may essentially comprise a head 30" and a stem 30' which may include or consist of a shaft 33 comprising a pair of opposite portions 34, 39.

The shaft 32 and the stem 30' may be mutually coupled by means of suitable coupling means 70 configured so that for the section T1 of the sliding of the shaft 32 the stem 30' does not slide, and so that for the section T2 of the sliding of the shaft 32 the stem 30' slides.

Figure 7:
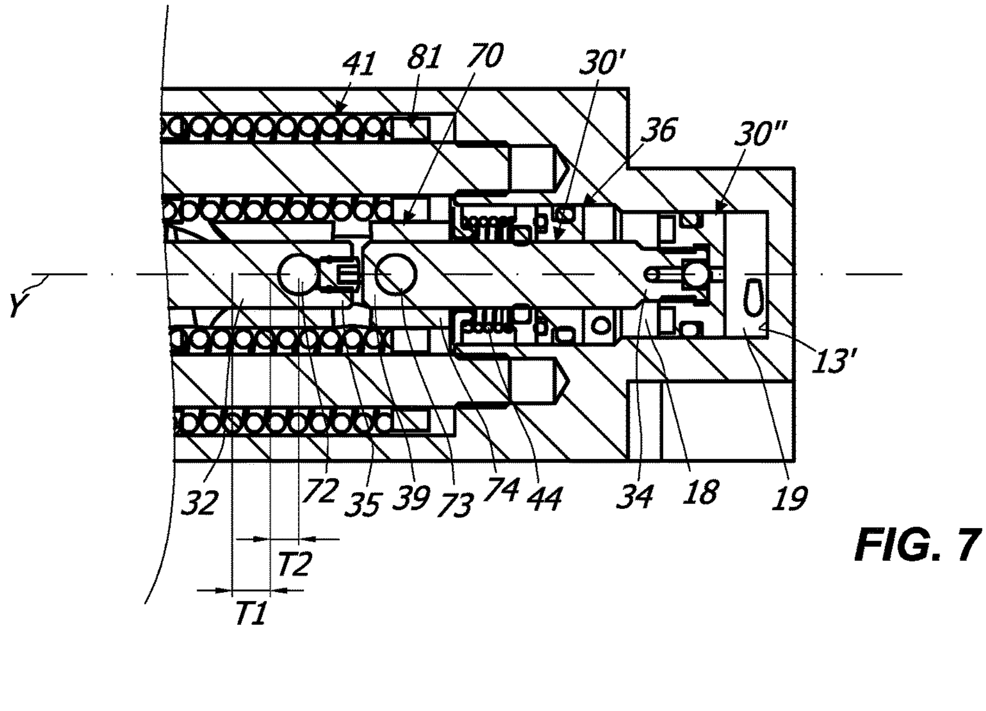
Figure 8:
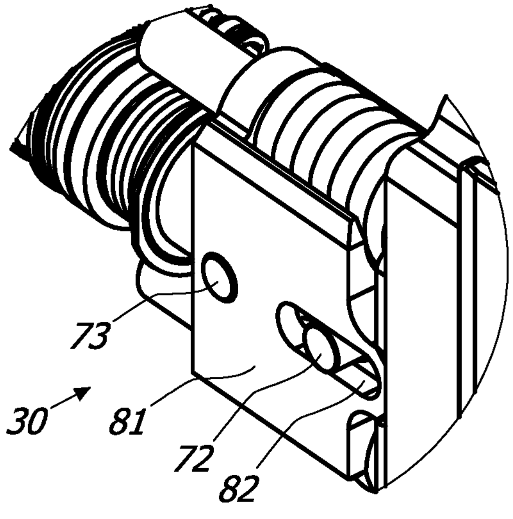
Figure 9:
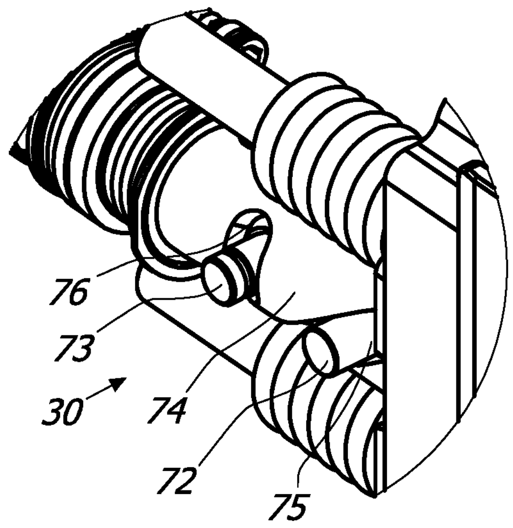
Figure 10:
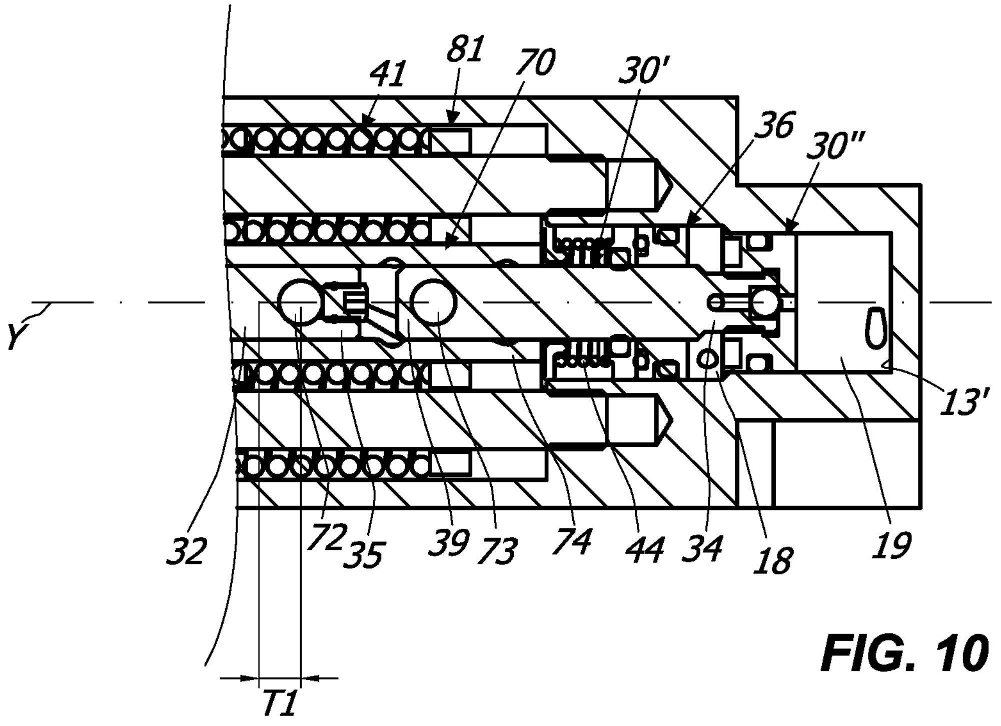
Figure 11:
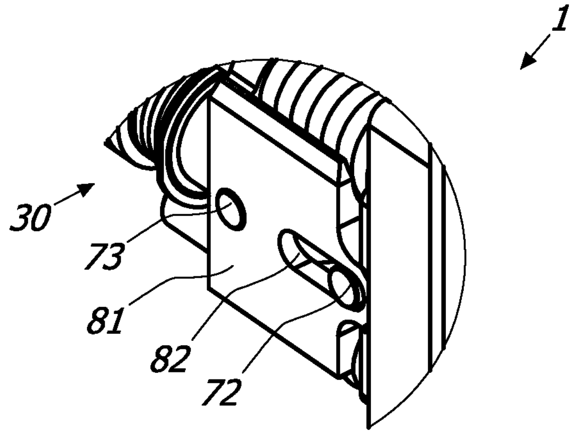
Figure 12:
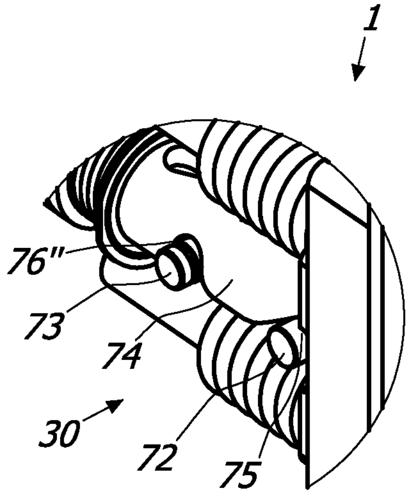

In other words, at the portion T1 of the stroke of the shaft 32, the shaft 32 alone may slide and the distance between the end 31 and the portion 39 of the stem 30' may vary (from FIG. 13 to FIG. 10), while at the section T2 of the stroke of the shaft 32 both shafts 32, 33 may slide and the distance between the end 31 and the portion 39 of the stem 30' may remain substantially unvaried (from FIG. 10 to FIG. 7).

The section T2 of the stroke of the shaft 32 may therefore correspond to the stroke of the plunger element 30.

Suitably, the mechanical elements 40 and the hydraulic control elements 50 may be configured to act on the plunger element 30 alone so that they counter and/or damp the sliding of the plunger element 30 upon the sliding thereof, and so that they do not hinder the sliding of the shaft 32 at the section T1 of the stroke.

Suitably, the section T1 of the stroke of the shaft 32 may correspond to the rotation of the movable element 10 by a predetermined angle, for example 80°, and the section T2 of the stroke of the shaft 32 may correspond to the rotation of the movable element 10 by another predetermined angle, for example 100°. It is clear that such angles may vary according to the configuration as better explained hereinafter.

According to a particular embodiment illustrated for example in FIGS. 1-13, the coupling means 70 may comprise a rotating tubular coupling element 74 arranged along the axis Y which may have an actuator portion 75 mutually telescopically connected with the end 35 of the shaft 32 and a guide portion 76 mutually telescopically connected with the stem 30'.

In particular, a pin 72 passing through the shaft 32, preferably arranged in proximity of the end 35 opposite to the end 31, and a pin 73 which passes through the shaft 33, preferably arranged at the portion 39, may be provided for.

Suitably, anti-rotation means 80 acting on the stem 30' and possibly on the shaft 32 to prevent the rotation thereof around the axis Y may be provided for.

For example, the anti-rotation means 80 may comprise a carriage 81 which may be coupled to the hinge body 11 so as not to rotate around the axis Y. Thanks to such characteristics, the rotation of the shafts 32, 33 around the axis Y may be prevented.

In particular, the carriage 81 may have a slot 82 for the pin 72 and a slot 83 for the pin 73 and a central hole 84 to allow the stem 30' to pass through it. One of the slots 82, 83 may be extended along an axis substantially parallel to the axis Y, for example the slot 82.

More in particular, the slot 82 may be extended while the slot 83 can have the same dimensions as the pin 73, for example it may be a circular hole.

Thanks to such characteristic, the pins 72, 73 may be guided so that they slide with the respective shafts 32 and 33 along an axis substantially parallel to or coinciding with the axis Y.

Furthermore, thanks to the slots 82, 83, the pins 72, 73 may slide integrally joined with each other along the section T2 of the stroke of the shaft 32 while they may vary the distance thereof along the section T1 of the stroke thereof. In particular, the slots 82, 83 may act as stop means for defining the maximum and/or minimum distance between the pins 72, 73 and therefore the length of the stroke of the section T1.

The coupling means 70 may further comprise a cylindrical guide element 74 which may be fitted on the shafts 32, 33. Preferably, the tubular coupling element 74 may remain substantially interposed between the shafts 32, 33 and the slider 81.

Such tubular coupling element 74 may be free to rotate around the axis Y and axially locked with respect to the axis so as to prevent the sliding thereof along the axis Y.

The tubular coupling element 74 may have a groove 75 for the pin 72 defining the actuator portion and a groove 76 for the pin 73 defining the guide portion. Suitably, the grooves 75, 76 may be inclined with respect to the axis Y, i.e. they may have a substantially helical development with respect to the axis Y.

In this manner, the sliding of one of the pins 72, 73 along the axis Y may correspond to the rotation of the tubular coupling element 74 around the axis Y and the consequent sliding of the other of the pins 72, 73 along the axis Y.

It is clear that depending on the inclination of the grooves 75, 76 with respect to the axis Y as well as on the mutual inclination of the grooves 75, 76, different slidings of the respective pins 72, 73 and therefore of the shaft 32 and of the stem 30' may be obtained.

For example, the groove 75 may have a substantially continuous inclination, while the groove 76 may have a portion 76' having an inclination substantially similar to the groove 75 so that the pins 72, 73 move integrally joined and a portion 76" substantially transverse to the axis Y.

In this case, when the pin 73 is at the portion 76", upon rotation of the tubular coupling element 74 the pin 72 may slide along the axis Y, and thus also the shaft 32, while the pin 73 may remain inside the second portion 76" and the stem 30' may not slide.

In other words, when the pin 73 is in position 76', the shaft 32 and the stem 30' may slide along the axis Y integrally-joined defining the section T2, so that the movement of the stem 30' is controlled, while when the pin 73 is in position 76", the shaft 32 can slide and the stem 30' may slide along the axis Y defining the section T1, so that the mechanical 40 and the hydraulic 50 elements do not hinder the sliding of the shaft 32.

It is clear that the length of the sections T1 and/or T2 of the stroke of the shaft 32 and thus the free or controlled angular rotation sections of the door D may vary depending on the length of the groove 75 and of the portions 76' and 76".

As a matter of fact, the portions 76', 76" may have a respective predetermined length defining the length respectively of the section T2 and of the portion T1 of the sliding of the shaft 32.

Furthermore, each of the grooves 75, 76 may comprise a respective pair of bottom walls 77, 77' and 78, 78' designated to act as abutment for the respective pin 72, 73 so as to define the proximal and distal position of the shaft 32.

According to a different embodiment illustrated for example in FIGS. 14-17, the coupling means 70 may comprise a pair of jaws 90 each having an actuator portion 95 removably connected with an end portion 35 of the connecting shaft 32 and a portion 96 connected with the portion 39 of the stem 30'.

In particular, the jaws 90 may be rotationally movable between a proximal closed position (FIG. 15), in which the actuator portion 95 is connected to the end 35 of the connecting shaft 32 to slide therewith defining the section T2 and a distal open position (FIG. 17) in which the actuator portion 95 is disconnected from the opposite end 35 of the connecting shaft 32 so that the latter slides freely defining the section T1.

Figure 15:
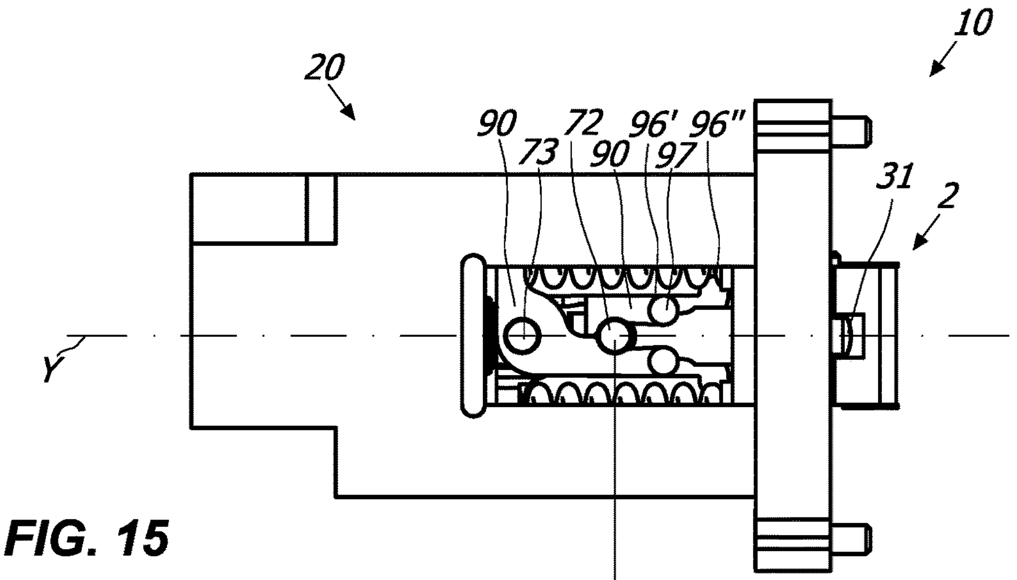
FIGS. 15, 16, 17 are schematic views of some details of the hinge device 1 of FIG. 14 in different operating steps.
Figure 16:
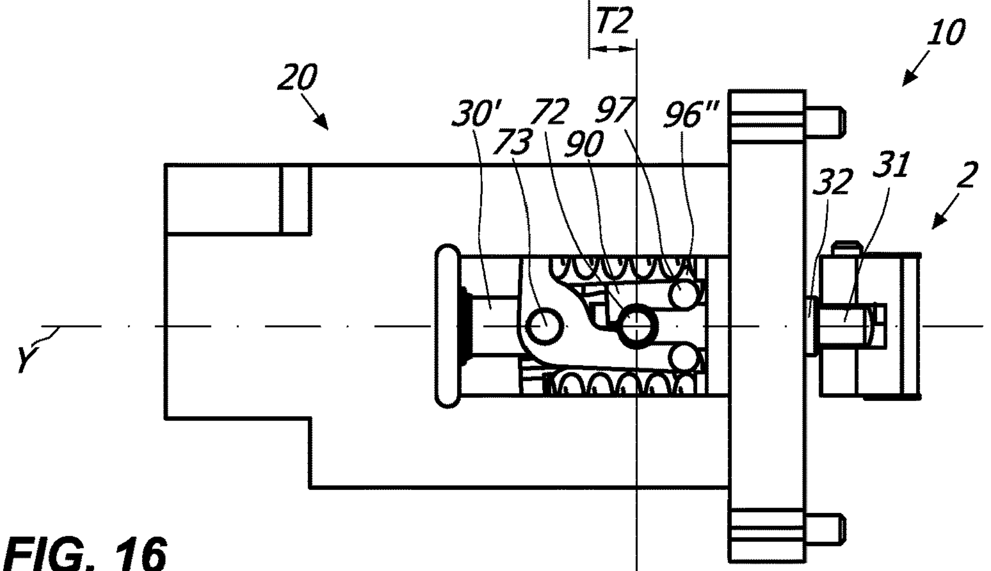
Figure 17:
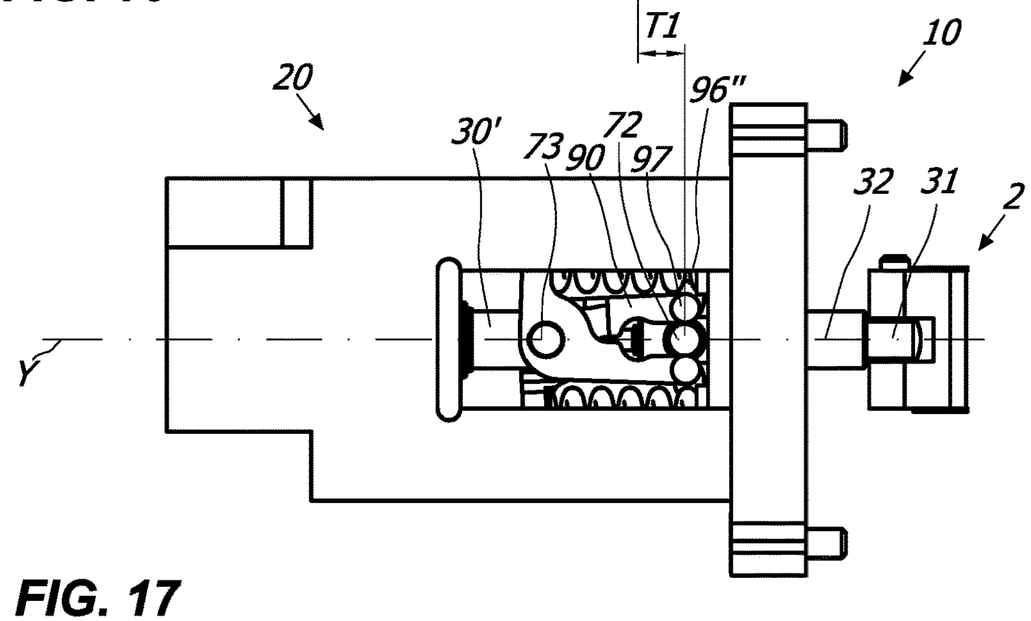

For example, during the sliding of the shaft 32 from the position of FIG. 15 to the position of FIG. 16 may correspond to section T2 while the sliding of the shaft 32 from the position of FIG. 16 to the position of FIG. 17 may correspond to section T1.

Suitably, FIGS. 15, 16 and 17 may correspond to predetermined angles for opening the door D. For example, at FIGS. 15, 16 and 17 the door may have an opening angle of 0° (i.e. closed door), 80° and 180° (i.e. open door), respectively.

In other words, the intermediate position at FIG. 16 may define the passage from section T1 to section T2, i.e. the rotation angle in which the door D is free or controlled.

More in detail, the coupling means 70 may comprise at least one guide element 91 with a guide rail 92 having a portion 96' with an inclination substantially parallel to the axis Y and a portion 96" substantially transversal or perpendicular to the axis Y.

The guide rail 92 may be formed by means of a groove in the main body 11 and in this case the latter or a part thereof may define the guide element 91.

On the other hand, according to a different preferred but non-exclusive embodiment, a plate-like element 91 comprising the guide rail 92 may be provided for. For example, the plate-like element 91 may comprise grooves and/or projections defining the guide rails 92.

Suitably, a pair of guide rails 92 arranged on opposite sides with respect to the jaws 90 may be present, and each of the guide rails 92 may guide one or both of the jaws 90.

For example, a pair of plate-like elements 91 arranged on opposite sides with respect to the jaws 90 may be provided for, each having a groove or a pair of grooves 92 for guiding one or both of the jaws 90.

The jaws 90 may comprise a guide portion 97 or a pair thereof which may interact with the grooves 92 so as to be guided by them.

The guide rails 92 may be configured so that when the guide portion 97 is at the portion 96' the jaws 90 are in the closed position and the connecting shaft 32 and the stem 30' slide integrally joined and so that, when the guide portion 97 is at the portion 96", the jaws 90 are in the open position and the connecting shaft 32 slides and the stem 30' does not slide.

The portion 96 of the jaws 90 may comprise a through hole 93 for the pin 73 (similarly to the hole 83).

Advantageously, such pin 73 may also guide the rotation of the jaws 90 between the distal open position and the proximal closed position.

Furthermore, the jaws 90 may comprise a respective concave area 95 defining the actuator portion 95, which may be at contact with pin 72 when the jaws 90 are in the closed position, and they may be spaced apart from the pin 72 when the jaws 90 are in the open position.

It is clear that when the actuator portion 95 is at contact with the pin 72, the portion 35 of the shaft 32 and the jaws 90 (and thus the stem 30' by means of the pin 73) may be mutually coupled to slide integrally joined along the axis Y.

In other words, similarly to the above description, even in this case the coupling means 70 may allow the free sliding of the shaft 32 and therefore the free rotation of the door D for a section T1, that is when the portion 95 is disconnected from the end 35 of the shaft 32, and they may control the sliding of the shaft 32 and thus the rotation of the door D for a section T2, that is when the portion 95 is connected to the end 35 of the shaft 32.

In a preferred but non-exclusive embodiment of the invention, a substantially cylindrical-shaped cavity 12 which may comprise a pair of opposite bottom walls 13, 13' may be provided for.

The cavity 12 may comprise a working chamber 14 comprising the mechanical control elements 40 and a working chamber 15 comprising the hydraulic control elements 50. Preferably, the working chamber 15 may include a working fluid, for example oil, for hydraulically damping the movement of the plunger element 30.

The mechanical control elements 40 may comprise elastic counteracting elements 41, for example a spring, and preferably a pair of springs 41 which may act on the plunger element 30.

Suitably, the springs 41 may be arranged along an axis Y' substantially parallel to the axis Y and spaced apart from the latter. In other words, the chamber 14 may have a half-chamber 14' arranged along the axis Y for the shaft 32 and at least one half-chamber 14" arranged along the axis Y' for the elastic counteracting means 41.

Preferably, a pair of springs 41 and a pair of half-chambers 14" 14" may be provided for each arranged along a respective axis Y' parallel to the axis Y. In other words, the half-chambers 14' 14" and 14'" may be substantially arranged adjacent to each other in a manner such that the length of the chamber 14 is relatively small.

Thanks to such characteristic, the overall dimensions may be particularly small, while maintaining the high effectiveness of the counteracting elements 40.

The carriage 81 may comprise a pair of opposite portions 85, 86 each comprising a respective abutment surface 85', 86' for the springs 41. The abutment surfaces 85', 86' may therefore be substantially perpendicular to the axis Y.

In particular, the springs 41 may be arranged on the opposite side with respect to the stem 30' and they may remain interposed between the fixed element 20 and the abutment surfaces 85', 86' of the carriage 81. More in detail, the springs 41 may be interposed between the bottom wall 13 and the abutment surfaces 85', 86' of the carriage 81 so that the latter acts as an abutment for the springs 41.

It is clear that such abutment surfaces 85', 86' may be arranged in the half-chambers 14" and 14'". In this manner, the overall dimensions may be particularly small. Suitably, the springs 41 may be compression springs so that over the section T2 they counter the sliding of the carriage 81 and thus of the stem 30' and thus of the plunger element 30. It is clear that the springs 41 may promote the sliding of the carriage 81 in the opposite direction.

If the jaws 90 are present, each of the latter may comprise a respective portion 85, 86 which includes a respective abutment surface 85', 86' for the springs 41 similarly to the description outlined above regarding the carriage 80.

In this case, the springs 41 may therefore act on the jaws to counter/promote the sliding of the jaws 90 and therefore of the plunger element 30.

Suitably, the springs 41 may be arranged along the respective axis Y', which may therefore be spaced apart with respect to the axis Y and, preferably, parallel thereto. The abutment surfaces 85', 86' may also be arranged along said axes Y' transversely thereto to intercept the springs 41. On the other hand, the pin 73 may be placed along the axis Y in a manner substantially transverse thereto, preferably perpendicularly.

In this manner, the action of the springs 41 may promote the rotation of the jaws 90 around the pin 73.

In any case, the springs 41 may preferably counter the sliding of the plunger element 30 from the stroke-end position to the stroke-start position and they may promote the sliding thereof from the stroke-start position to the stroke-end position. In this manner, the hinge device 1 may have an automatic closure.

In other words, the springs 41 may therefore act on the shaft 81 or on the jaws 90 when they slide integrally joined with the stem 30". Therefore, it is clear that the stroke of the plunger element 30 may correspond to the section T2 of the sliding of the shaft 32.

Similarly to the springs 41, also the hydraulic control elements 50 may control the movement of the door D over the section T2 of the stroke of the shaft 32, i.e. upon the stroke of the plunger element 30. In other words, both the mechanical elements 40 and the hydraulic elements 50 may act on the plunger element 30 alone so that when the latter is stationary, the door D can rotate freely.

The chambers 14 and 15 may therefore be separated from each other by means of a hydraulic sealing element 36, for example a lip seal with relative O-ring, so that the working fluid lies exclusively in the chamber 15.

In this manner, the chamber 15 may be the hydraulic chamber, while the chamber 14 may be the mechanical chamber, without hydraulic damping means. The springs 41 and the carriage 81 may therefore be housed in the chamber 14 as described above.

More generally, the hydraulic sealing element 36 may be substantially disc-shaped with a maximum outer diameter substantially equal to or larger than the inner diameter of the cavity 12.

Suitably, the stem 30' may pass through the hydraulic sealing element 36 so that the portion 39 is in the chamber 14 preferably slidable therein, while the portion 34 is in the chamber 15.

Suitably, the portion 34 may be coupled with or integrated in the head 30". Possibly, the portion 34 may define the head 30" of the plunger element 30.

The hydraulic sealing element 36 may therefore have a central through hole for the stem 30'. Suitably, an elastomeric annular sealing element, for example an O-ring, may also be provided for interposed between the stem 30' and the hydraulic sealing element 36 to prevent the fluid from spilling from the chamber 15.

Advantageously, the hydraulic sealing element 36 may be slidably inserted into the cavity 12.

In this manner, the hinge 1 may be very simple to manufacture and assemble. As a matter of fact, all the pieces can be fitted onto the stem 30' and the cavity 12 may be divided into the chambers 14 and 15 simply by means of the hydraulic sealing element 36.

Suitably, the plunger element 30 may comprise the head 30" which may be hermetically inserted into the working chamber 15 to partition the latter into at least one first and one second variable volume compartment 18, 19 which are placed in fluid communication with each other and preferably adjacent to each other. More in particular, the working fluid flows from the compartment 19 to the compartment 18 upon opening the shutter D, while the working fluid backflows from the compartment 18 to the compartment 19 upon closing the shutter D.

It is clear that the head 30" may comprise an elastomeric annular sealing element 38, for example an O-ring, interposed between the head 30" and the wall of the chamber 15.

The chamber 15 may slidably house the head 30", which may therefore slide between the positions distal from and proximal to the bottom wall 13' corresponding to the stroke start and end position of the plunger element 30. In other words, the head 30" may remain interposed between the hydraulic sealing element 36 and the bottom wall 13'.

Suitably, at least one hydraulic circuit 51 which may place in fluid communication the compartments 18, 19 may be provided for so as to allow the through-flow of the fluid from one to the other upon the sliding of the plunger element 30. Possibly, a hydraulic circuit 51 for allowing the through-flow of the working fluid from the compartment 18 to the compartment 19 and a hydraulic circuit 52 for allowing the through-flow of the working fluid from the compartment 19 to the compartment 18 may be present.

Such circuits 51, 52 may be of the per se known type and may comprise, for example, restrictions, conduits, valve means or the like.

For example, circuit 52 may comprise a calibrated passage, while the circuit 51 may comprise a relatively large passage section and a check valve to prevent the backflow of the fluid through the circuit.

In this manner, the action of the hydraulic means 50 may be different during the opening and the closing of the door D.

The hydraulic circuits 51, 52 may be arranged inside the plunger 30 and/or inside the hinge body 11 and they may have different configurations depending on the needs.

Furthermore, adjustment means 55 acting on the hydraulic circuit 51 and/or 52 may be provided for to vary the damping action. For example, such adjustment means 55 may vary the passage area of the fluid in the hydraulic circuit 51 and/or 52.

For example, the hydraulic means 50 may be obtained according to the disclosures provided for by the Italian patent application number 102018000008233, on behalf of the Applicant in question.

The hydraulic sealing element 36 may therefore act on one side against the head of working fluid and on the other side against the rotating tubular coupling element 74. In particular, the hydraulic sealing element 36 may therefore have a face 36' facing one of the variable volume compartments 18, 19 and an opposite face 36" abutting against the rotating tubular coupling element 74. Furthermore, the opposite face 36" may face the carriage 81 for acting as an abutment against the latter.

According to a different embodiment, means 44 may be provided for to hold the rotating tubular coupling element 74 in position during use. For example, the means 44 may include an elastic counteracting element 44, such as a spring, which may therefore be interposed between the rotating tubular coupling element 74 and the hydraulic sealing element 36, and in particular they may abut against the face 36" of the latter.

If the jaws 90 are present, the means 44 may remain interposed between the face 36" of the hydraulic sealing element 36 and the jaws 90.

The means 44 may therefore comprise a spring, which can be fitted onto the stem 30' and may therefore act on the hydraulic sealing element 36.

In any case, the chambers 14, 15 may be arranged consecutively along the axis Y so that the movable element 10 has a length substantially equal to the shafts 32 and to the plunger element 30, while the height may be substantially equal to the diameter of the head 30" of the plunger 30.

Thanks to such characteristic, the hinge body 11 may have particularly small overall dimensions. In particular, the hinge 1 may be particularly short.

Although in the present document it has been stated that the mechanical means 40 may counter the sliding of the plunger member 30 from the distal position to the proximal position, and the hydraulic means 50 may damp the sliding of the plunger element 30 from the proximal position to the distal position, it is clear that this embodiment is not exclusive.

As a matter of fact, the mechanical means 40 may promote or damp the sliding of the plunger element 30 while the hydraulic means 50 may damp the sliding thereof in one or in both directions of sliding.

In other words, depending on the configuration of the mechanical means 40, for example on the hardness or configuration of the springs 41, and on the configuration of the hydraulic means 50, for example the configurations of the circuits 51, 52 and the adjustment means 55, the door D may be controlled in a different manner at the section T2 of the stroke of the plunger element 30, while the door D may remain substantially free at the section T1 of the stroke thereof.

Furthermore, it is clear that the mechanical means 40 and the hydraulic means 50 may operate alternatively, for example the former to close and the latter to open, and/or they may operate synergistically to control the movement of the door D.

In light of the above, it is clear that the hinge according to the invention attains the pre-set objectives.

The invention is susceptible to numerous modifications and variants all falling within the inventive concept outlined in the attached claims. All details can be replaced by other technically equivalent elements, and the materials can be different depending on the technical needs, without departing from the scope of protection of the invention.

Even though the invention has been described with particular reference to the attached figures, the reference numbers utilised in the description and in the claims are meant for improving the intelligibility of the invention and thus do not limit the claimed scope of protection in any manner whatsoever.

The invention claimed is:

1. A hinge device for a rotatable movement of a closing element between a closing position and an opening position, the closing element being anchorable to a stationary support structure, the hinge device comprising:

a fixed element anchorable to one of the stationary support structure and the closing element; and a movable element anchorable to another one of the stationary support structure and the closing element, the fixed and the movable elements being mutually coupled so that the movable element rotates around a first longitudinal axis between an opening position and a closing position of the closing element, wherein one of the fixed or the movable elements includes a main body with an inner cavity having a hydraulic sealing element dividing the inner cavity into a first hydraulic working chamber and a second mechanical working chamber, and wherein the inner cavity further has a plunger disposed therein that is slidable along a second axis perpendicular to the first axis between a stroke-start position and an end-stroke position, the plunger comprising:

a head sealingly inserted into the first hydraulic working chamber and dividing the hydraulic working chamber into a first and a second variable volume compartment placed in fluid communication with each other; and a stem passing through the hydraulic sealing element, the stem comprising a first portion operatively connected to the head and a second opposite portion slidable in the second mechanical working chamber, wherein the first hydraulic working chamber includes a working fluid and a hydraulic circuit that allows a through-flow of the working fluid between the first and the second variable volume compartment when the plunger moves between the start and the end-stroke positions, wherein the second mechanical working chamber includes:

elastic counteracting means acting on the plunger; and coupling means that couple the stem and the other one of the fixed or the movable elements and comprising a connecting shaft having an end operatively coupled to the other one of the fixed or the movable element for sliding along the second axis upon rotation of the movable element, wherein the hydraulic circuit and the elastic counteracting means cooperate to define means for controlling a sliding of the plunger between the start and the end-stroke positions, wherein the coupling means are configured so that, along a first section of the sliding of the connecting shaft, the plunger does not slide to enable a free rotation of the movable element, and so that, along a second section of the sliding of the connecting shaft, the plunger slides together with the connecting shaft to control the rotation of the movable element, and wherein the second mechanical working chamber comprises a bottom wall facing the hydraulic sealing element, the coupling means being interposed between the hydraulic sealing element and the bottom wall, second elastic counteracting means being interposed between the hydraulic sealing element and respectively the rotating coupling element or a guide element of the coupling means.

2. The hinge device according to claim 1, wherein the coupling means comprise a pair of jaws each having a first actuator portion removably connected to an opposite end of the connecting shaft and a second portion mutually connected to the second portion of the stem, and wherein the pair of jaws is rotationally movable between a closed position, in which the first actuator portion is connected with the opposite end of the connecting shaft to slide therewith and define the second section, and an open position, in which the first actuating portion is disconnected from the opposite end of the connecting shaft so that the connecting shaft slides freely and defines the first section.

3. The hinge device according to claim 2, wherein the pair of jaws comprises a third guide portion, the coupling means comprise the guide element with a guide rail having a first portion with an inclination parallel to the second axis, and a second portion perpendicular to the second axis, so that, when the third guide portion of the jaws is at the first portion, the jaws are in the closed position, and when the third guide portion is at the second portion, the jaws are in the open position.

4. The hinge device according to claim 3, wherein the coupling means comprise a first pin passing through the connecting shaft and a second pin passing through the stem, the second portion of the jaws comprising a through hole configured to receive the second pin so as to mutually couple the second portion of the stem and the jaws.

5. The hinge device according to claim 4, wherein the second pin is arranged along the first axis transversely thereto to rotationally support the jaws between the open and the closed positions, the counteracting elastic means acting on the jaws along a third axis parallel to the second axis and spaced therefrom to promote the rotation of the jaws around the second pin.

6. The hinge device according to claim 1, wherein the coupling means comprise:

a rotating tubular coupling element defining the second axis and having a first actuator portion telescopically connected to an opposite end of the connecting shaft and a second guide portion telescopically connected to the second portion of the stem; and anti-rotation means acting on the stem and on the connecting shaft (32), whereby the rotation of the movable element promotes the rotation of the rotating tubular coupling element around the second axis, the rotating tubular coupling element promoting the sliding of the head along the second axis guided by the second guide portion.

7. The hinge device according to claim 6, wherein the coupling means comprise a first pin passing through the connecting shaft and a second pin passing through the stem, the rotating tubular coupling element having a first groove configured to receive the first pin and define the first actuator portion, and a second groove configured to receive the second pin and define the second guide portion.

8. The hinge device according to claim 7, wherein the second groove comprises a first portion having an inclination equal to the inclination of the first groove, and a second portion perpendicular to the second axis, so that when the second pin is in correspondence of the first portion of the second groove, the connecting shaft and the stem slide jointly to each other, and when the second pin is at the second portion, the connecting shaft slides and the stem does not slide.

9. The hinge device according to claim 1, wherein the second mechanical working chamber has a first half-chamber arranged along the second axis for the connecting shaft, and a second half-chamber arranged along a third axis parallel to the second axis and spaced apart the second axis for the elastic counteracting means.

* * * * *